M. R. HUTCHISON.
SPEED REGULATOR FOR MOTOR VEHICLES.
APPLICATION FILED JULY 27, 1906. RENEWED NOV. 12, 1913.
1,142,099.
Patented June 8, 1915.
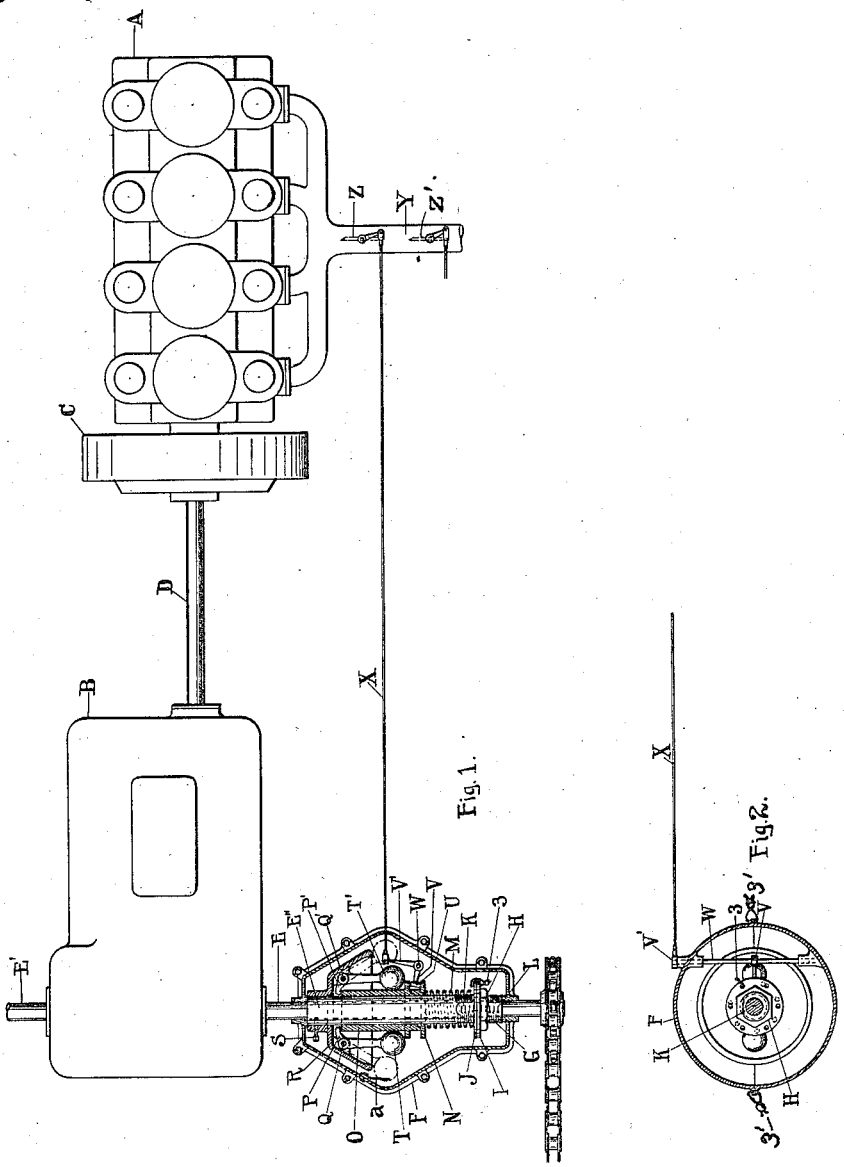

UNITED STATES PATENT OFFICE.

MILLER REESE HUTCHISON, OF BAY SHORE, NEW YORK.

SPEED-REGULATOR FOR MOTOR-VEHICLES.

1,142,099.　　　　Specification of Letters Patent.　　Patented June 8, 1915.

Application filed July 27, 1906, Serial No. 328,027. Renewed November 12, 1913. Serial No. 800,660.

*To all whom it may concern:*

Be it known that I, MILLER REESE HUTCHISON, a citizen of the United States, and a resident of Bay Shore, in the county of Suffolk and State of New York, have invented certain new and useful Improvements in Speed-Regulators for Motor-Vehicles, of which the following is a specification.

My invention relates more particularly to motor vehicles such as are intended for use on streets and highways for commercial or pleasure purposes. Vehicles of this class, particularly those employed as trucks and delivery wagons are, from the nature of their use, free from the direct supervision and control of intelligent engineers. In many cases they are in charge of ignorant or careless drivers who frequently operate the motor or the vehicle or both at excessively high speeds. Such operation is especially detrimental to heavy trucks having solid tires, because of the comparatively great vibration of parts and the resulting great strain on the running gear, springs, etc.

In practice the vehicle must be equipped with a motor and gearing so designed as to meet the hardest conditions in which the vehicle will be required to operate; that is to say, the motive power and the gearing must be designed with a view to satisfactorily transporting the heaviest load to be carried over the worst road on which it is intended to operate. The limit of the ability of the car in this direction will depend upon the horse-power of the engine at full speed and the ratio of speed reduction of the lowest speed gear. For practical reasons, therefore, it is necessary to give the operator full control of the motor to operate the same at the highest speed in order to develop the maximum horse-power when required by adverse conditions of operation. It is found, however, that as a general rule the maximum horse-power necessary to overcome the worst conditions will, if fully applied under favorable conditions, drive the vehicle at a speed far in excess of the maximum road speed which can be permitted without detriment to the vehicle or danger to traffic. Particularly is this the case with heavy trucks which are generally supplied with very powerful motors. Motor-trucks of this class may be kept down to a desired safe maximum speed of, say, fifteen miles an hour, by using a high speed gear, which will give only fifteen miles an hour with the engine running at its maximum rate. This is a common expedient, but is objectionable because the maximum road speed requires maximum motor speed under conditions not requiring the maximum horse-power and such operation results in great wear and tear of both the motor and vehicle. For instance, a five ton truck after delivering goods at a distance may be subject to more destructive wear and tear by an ignorant driver speeding home than it would from a long period of legitimate use for its intended purpose.

The object of my invention is to prevent, as far as possible, detrimental operations of the class illustrated in the above without interfering with any useful function of the apparatus. To this end I have devised means for controlling and limiting the speeds of road travel of a motor-vehicle by controlling or limiting the motor speed by and in accordance with the road speed. It is possible to apply this principle to control of the lower speeds, and it will be obvious that this may be done where necessary in the case of a truck obliged to travel continuously long distances at a low rate of speed, either because of the character of the load which would make it liable to damage, or because of the closeness of the traffic, as in the busy streets of large cities. Under such conditions the driver may persist in operating on a low speed gear at full motor speed, although the condition would not require more than a quarter or an eighth of the horse-power of the motor to maintain that speed. In such case an automatic throttling of the motor in accordance with the speed of the vehicle might be desirable even for the lower speeds. As a matter of fact, however, I find in practice that this is not likely to occur, because in dense traffic the driver is always obliged to give strictest attention and his best skill to steering and control. It is not in such situations that reckless and useless speeding of the motor is likely to occur. Because of these practical considerations, I ordinarily apply my invention in such a manner as to govern or throttle the motor at maximum road speeds and the apparatus which I show and describe herein, as illustrating the principle of my invention, is designed and adapted for adjustment to make the maximum road speed as high or as low as may be desired.

My invention may be applied in the original designing of the truck and change-speed-gear, or it may be applied as an attachment to existing motor-vehicles. As the former involves the more detailed description, I will describe a desirable arrangement of change speed gearing and automatic governor for use on a motor truck. For such purpose I select the high speed gear of such ratio that the motor may turn at a reduced rate when the vehicle is traveling at the highest desired speed, say fifteen miles an hour. The motor speed may be a half speed, or, say, five or six hundred revolutions for a motor designed for a thousand revolutions per minute as a maximum, and to secure this I provide an automatic throttling mechanism which will throttle the motor when the vehicle travels faster than the desired rate of fifteen miles per hour.

As a specific illustration of the above principle, I may refer to the case of a motor-truck provided with an engine adapted to turn over a thousand revolutions a minute as a maximum. I gear this motor to the driving wheels so that when the engine is turning at the maximum rate, a thousand revolutions a minute, the car will travel on the first speed one mile an hour, on the second speed six miles an hour, on the third speed twelve miles an hour, and on the highest speed twenty-five miles an hour; but the automatic throttling mechanism will shut down the engine when the truck travels in excess of a fifteen mile speed, so that on the high speed the motor will turn at only five or six hundred revolutions per minute and the car can travel at only fifteen miles an hour. In some cases the third speed might be made fifteen miles an hour, so that a heavy load could be carried at maximum speed with the engine turning at the maximum rate of a thousand revolutions per minute; but it is better to have the maximum speed for loads, with motor running at full capacity, slightly less than fifteen miles an hour, so that there will always be an inducement for the operator when traveling light to change from the third speed gear to the fourth, or maximum speed.

With the above explanation, it will be understood that I may use a high speed gear connection of considerably higher rate than is necessary to give the desired maximum road speed at full speed of the engine, and in combination with this, means for slowing down the engine to the desired maximum road speed. The means for slowing down the engine is preferably automatic and preferably acts by throttling.

While the invention is particularly applicable to trucks, it is also useful in connection with comparatively high speed automobiles, used for touring, pleasure, or business purposes, where racing speeds are not desirable. Such a vehicle may be provided with a high speed gear for driving at full speed up grades which require the full horse-power of the engines to maintain such speed, in combination with my higher ratio gear and automatic throttle to slow down the motor and thus maintain the same road speed under easier conditions where considerably less horse-power is required.

In the case of applying my device as an attachment to an existing car for the purpose of limiting the speed, there is already on the car, a gear which gives too high speed when the engine is turning over at its maximum rate. The mere application of my automatic throttling device to such a machine results in controlling the high speed by controlling the motor speed as in the case first considered.

For my purposes, I employ a simple governing device controlled from or by any part of the vehicle or its attachments, which is connected to the ground, or which is otherwise caused to have a speed of movement proportional to the road speed of the vehicle. The connection may be indirect, as to a speed measuring instrument; but the connection is preferably more direct, as, for instance, to the counter shaft to which the driving sprockets are attached, or to the main shaft of a live axle, or anywhere between the change of speed mechanism and the ground. In the case of a chain driven car, I prefer to locate it on the counter shaft and in the case of a direct-drive car on the fore and aft direct driving shaft, because in both, the direct driving connection with the wheels of the vehicle insures a speed normally in direct proportion to the road speed of the vehicle. The governing device is preferably mounted on some part of the car above the springs, because in such location it is freer from excessive vibration. A desirable location would be in a supplemental compartment of the gear case itself, but this is not shown, and for the sake of simplicity of description I have shown it attached to one section of the divided counter-shaft of a chain driven car.

Referring to the drawings: Figure 1 is a top plan view showing the motor, clutch, change speed gear, and counter-shaft of a chain driven car, with the speed governing mechanism being shown in horizontal section, and Fig. 2 is a vertical section of the speed governing mechanism.

The illustration of the motor, clutch, and gear box is merely conventional, as the particular design of these parts is not essential. As shown, the motor A is an ordinary gasolene engine, although it may be any other desired form of motor. It is connected with the gear box B through clutch C by shaft D. From this shaft connection is made through the various change speed gears and a differential of any known or desired type, with a divided counter shaft E E', one section of which, as E, carries the governing device. This is inclosed by a case F, secured from rotation with the shaft E in any desired way, as by connection to an adjacent part of the frame of the vehicle.

On the shaft E is a sleeve E'' threaded at G, on which screws the adjustable nut H, carrying the flange I.

J is a washer known as a D washer, having a hole therein which is not a true circle but flattened on one side to fit sleeve E'' which is likewise flattened as shown at K. On the flattened surface certain lines and figures L are marked, indicating the adjustment of nut H for desired speeds. These may be in kilometers or miles per hour.

M is a spring which tends to force sleeve N away from nut H. Sleeve N extends to, and engages levers P and P', which are pivoted at Q and Q' on a support R.

R is made fast to shaft E by a set screw S, which passes through sleeve E'' and causes said parts to revolve with the shaft. Levers P and P' carry governor balls T and T' which, when actuated by centrifugal force in excess of the strength of the spring M, cause levers P and P' to force sleeve N toward nut H, compressing said spring. A roller U, on lever V, attached to shaft W, as shown more distinctly in Fig. 2, being operated upon by the groove of sleeve N, operates rod X by means of lever V', which is attached to outer end of shaft W, and partly or completely closes the supply pipe Y, by butter-fly valve Z. The outward movement of the balls in limited by coming in contact with R as indicated in dotted lines.

The radial and angular relations of the arms of the levers V and V' and of the valve Z, and its operating lever, as well as the proportions of the governor proper and length of the link X, may be designed to cause Z to operate gradually or abruptly so as to have a very narrow or very wide range of control of the motor through a greater or less extended range of variation of the road speed of the vehicle.

The adjustment and operation of the device shown is as follows: The sectional case F being open, the nut H is screwed along the shaft, carrying with it the D washer J, thus causing a greater or less compression of the spring M, according to the direction of the adjustment. The flattened surface K, which serves as the key for J, is calibrated in accordance with the design and proportion of parts of the vehicle and of the governor, so that when the nut is set at the calibrating mark, indicating the desired maximum speed, the tension of the spring will be such as to be counter-balanced by the centrifugal force of the balls T T' of the governor, which have a definite speed for every road speed of the vehicle, because they are mounted on the shaft E, which is sprocketed to the driving wheel. The nut H is fixed in position by securing it to the D washer J, as, for instance, in the manner shown in Fig. 2, where 3 is a seal pin or wire passing through registering holes in I and J. These holes may be differentially distributed around the two flanges, as shown, so that some hole in one will always be approximately in register with a hole of the other. The locking member 3 is preferably sealed so that the adjustment cannot be tampered with by the operator. The case F and the exposed connections of the lever V', connecting rod X and valve Z, may also be sealed or secured in such a manner as to prevent change of adjustment by the driver without leaving indications which will make evident to the superintendent, inspector, or owner that this part of the apparatus has been tampered with.

As shown in the drawing, the connecting rod X acts as a tension member to close the valve and as a thrust member to open it. If desired, it may be arranged to act in one direction only, the movement of the valve in the other direction being effected by a spring.

X may be a wire acting as a tension member to close the valve, a suitable spring acting in the opposite direction to open the same. In either case, this connection X may be suitably stayed or guided intermediate its ends, or, if desired, may be completely inclosed by tubular casing extending from F to Z.

The governor having been thus adjusted for a given maximum speed, (of say fifteen miles an hour in the case first above referred to) a driver may operate the car at the full speed of the motor of a thousand revolutions a minute on the lower gears, whenever great power is required for any of the reasons before mentioned. He may modify the speed of the motor in any of the usual or desired ways, as by changing the timing of the spark or by a foot-operated throttle of the conventional type. At low speed and under difficult conditions, there is no danger that he will not do this. Under favorable conditions of unobstructed roads with a heavy load to be transported, he may throw in the third speed gear and speed up his motor to the maximum horse-power. Under these conditions the full speed of the motor is justified, because he is doing profitable work in transporting his load to its destination at a safe speed and the truck being heavily loaded, irregular jerks and poundings are largely obviated because the motor is operating under an approximately full load. He has the usual spark and throttle control, which he may use wisely if he can or will. The throttle control may be of any suitable form, such, for instance, as a manually controlled valve Z'. In this situation, if he desires to operate on high speed gear, one of two things will happen. Either the conditions of grade and load will be favorable and the vehicle will increase its speed to fifteen miles an hour with the motor throttled down by the governor to the required speed of, say, five or six hundred revolutions a minute, or, if the conditions are adverse, the vehicle will be unable to reach the speed at which the governor operates, and the motor speed will be too low to develop sufficient power to sustain the desired speed of the vehicle.

There remains to be considered the one condition where my invention is of the greatest value and where the danger and damage to be averted is most serious. This occurs when the load has been delivered and the vehicle is returning light. Under these conditions the driver can only get twelve miles an hour on the third speed gear, with the motor working at its maximum speed of a thousand revolutions a minute, whereas by throwing on the high speed gear, he can get fifteen miles an hour with the motor working easily and quietly at five or six hundred revolutions. This is an inducement for him to use this high speed gear whenever possible. It brings him home faster, shakes him up less, uses less gasolene and oil, and involves less trouble and tinkering with the engine in the repair shop. In no case can he strain the running gear, springs, tires, etc., by driving at more than fifteen miles an hour, nor can he race the motor at that speed. The operator may, of course, exceed the speed of fifteen miles an hour in coasting down hills, but the wear and tear in such cases will be limited to the wear and tear of the running gear of the vehicle, because the motor may be completely shut off. In cases where the driver customarily coasts at excessive speeds, I provide a yielding contact member "a", with which the balls T T' will come in contact at a speed a certain amount higher than the speed for which the adjusting nut H is set. For instance, if H is is set for fifteen miles an hour, the governor may be arranged to slow down the engine at that speed and then by farther outward movement of the governor balls T T' at higher speeds, as when coasting, they will come in contact with "a". The surface of "a" may be covered with paint or sealing wax, which will be scraped off by the balls, thus showing that the maximum coasting speed has been exceeded. The case F being sealed or locked, the driver must bring home with him the record of his excessive coasting speed. The movement of "a" may be utilized to operate any desired form of alarm, indicator, or recorder, electrical or otherwise.

In some cases it may be desirable to have the maximum road speed limit fixed at a rate lower than that which one of the lower speed gears would give with the engine turning over at full speed. For instance, in the case above described, the governor may be set for six miles an hour. Under such conditions the motor will be throttled to approximately 500 or 600 revolutions per minute, when operating on the connection designed for twelve miles per hour, whereas at the same road speed, on the twenty-five mile connection, the engine would be throttled down to about two hundred revolutions per minute. Thus at low speeds a point may be reached where the power of the motor may be too small to drive the vehicle on the highest speed connection. In such case the third speed gear may be the highest speed gear practically usable for driving purposes.

My invention may be applied to any form of motor. In the case of the electric motor, a rheostat arm takes the place of the valve Z. In such case it is desirable to thus limit the rate of discharge of the storage batteries, as well as to limit the total power consumed.

With the above illustrative example of a concrete embodiment of my invention, together with the disclosure of the principles thereof, any one skilled in the art will be able to use the same or modifications thereof in any desired connection. From the description of the practical working of the invention in the hands of an ordinary operator under certain characteristic conditions, one skilled in the art will be able to understand the operation and advantages under analogous or modified conditions.

I claim:

1. A vehicle, a motor therefor, and a plurality of power transmitting connections of different speed ratios, for applying the power to drive the vehicle at different speeds, in combination with a centrifugal governor, connections for driving the same at a speed proportional to the speed of travel of the vehicle, a spring acting to oppose the centrifugal tendency of the governor, a nut for adjusting said spring and calibrating indicator marks adjacent to said nut to indicate the road speed of the vehicle corresponding to given adjustment of said nut, and means operating to throttle the motor when the centrifugal tendency of the governor overbalances the opposing means.

2. An attachment for motor-vehicles comprising a sleeve adapted to be fitted over a section of a driven shaft of the differential driving gear, in combination with a centrifugal governor, means for adjusting the same, and means for securing the parts in a desired position of adjustment, all carried by said sleeve.

3. An attachment for motor-vehicles comprising a sleeve adapted to be fitted over a section of a driven shaft of the differential driving gear, in combination with a centrifugal governor, means for adjusting the same, and means for securing and sealing the parts in a desired position of adjustment, all carried by said sleeve.

4. A vehicle, a motor therefor, power transmitting connections for applying the power of said motor at different speed ratios to drive the vehicle, manually operable means for controlling said motor to vary the speed of said vehicle, in combination with a governor, connections for driving the same at a speed proportional to the speed of travel of the vehicle, and means independent of said first-mentioned means and out of control of the driver but controlled by the operation of said governor for limiting the speed of the motor.

5. The combination with a motor vehicle provided with a motor of the explosive type, mechanism operated by said motor for producing movement of said vehicle, means to operatively connect and disconnect said mechanism with and from said motor, and means connected with said mechanism at all times while the motor vehicle is in motion to respond to the speed of the vehicle irrespective of the speed of the motor and control or regulate the supply of explosive mixture to the motor to prevent said vehicle being driven by said motor beyond a predetermined speed independently of the will of the operator, and to leave said motor under control of the operator to develop its full power when the vehicle is being driven below said predetermined speed, substantially as described.

6. The combination with an automobile provided with a motor of the explosive type, gearing driven by said motor for imparting different speeds to the vehicle, means for coupling said motor with said gearing, a governor permanently connected with said gearing and responsive to the speed of the vehicle at all times, and a valve controlling the supply of gas to the motor and operatively connected with said governor for controlling the said motor independently of the speed of the motor and independently of the will of the operator, while leaving said motor under control of the operator to develop the full power of the motor when the vehicle is being driven below the speed at which said governor acts, substantially as described.

7. In a motor vehicle, in combination, a motor of the explosive type, mechanism driven by said motor for propelling the vehicle, means to operatively connect and disconnect said mechanism with and from said motor, a valve to control the supply of explosive medium to said motor, and means for controlling said valve, said means being responsive to the speed of the vehicle at all times while the vehicle is in motion and controlling said valve independently of the will of the operator and independently of the speed of the motor, while leaving said motor under control of the operator to develop the full power of the motor when the vehicle is being driven below the speed at which said means act, substantially as described.

8. The combination with an automobile provided with a motor of the explosive type having connection with the running gear of the vehicle for propelling the same and for permitting the said motor to run without driving the automobile, a valve controlling the supply of explosive medium to the motor, and a device connected at all times with the running gear of the automobile and continuously responsive to the speed of the vehicle for throttling the supply of motive fluid to the motor when the automobile attains a predetermined speed and independently of the speed of the motor and of the will of the operator, while leaving the motor under control of the operator when the automobile is being driven below the speed at which the said device acts.

Signed at New York city in the county of New York and State of New York this 23 day of July A. D. 1906.

MILLER REESE HUTCHISON.

Witnesses:
S. J. GENSLER,
W. D. JUDKINS.